Dec. 29, 1964   L. A. DE PAS ETAL   3,163,028
AUTOMATIC DRY CLEANING MACHINE AND COMBINED
FLUID FILTER AND VAPOR CONDENSER
Filed Jan. 26, 1962                                           3 Sheets-Sheet 2

INVENTORS
Laddie A. DePas
BY Raymond W. Spiegel
Gordon J. Krolzick
ATTORNEYS

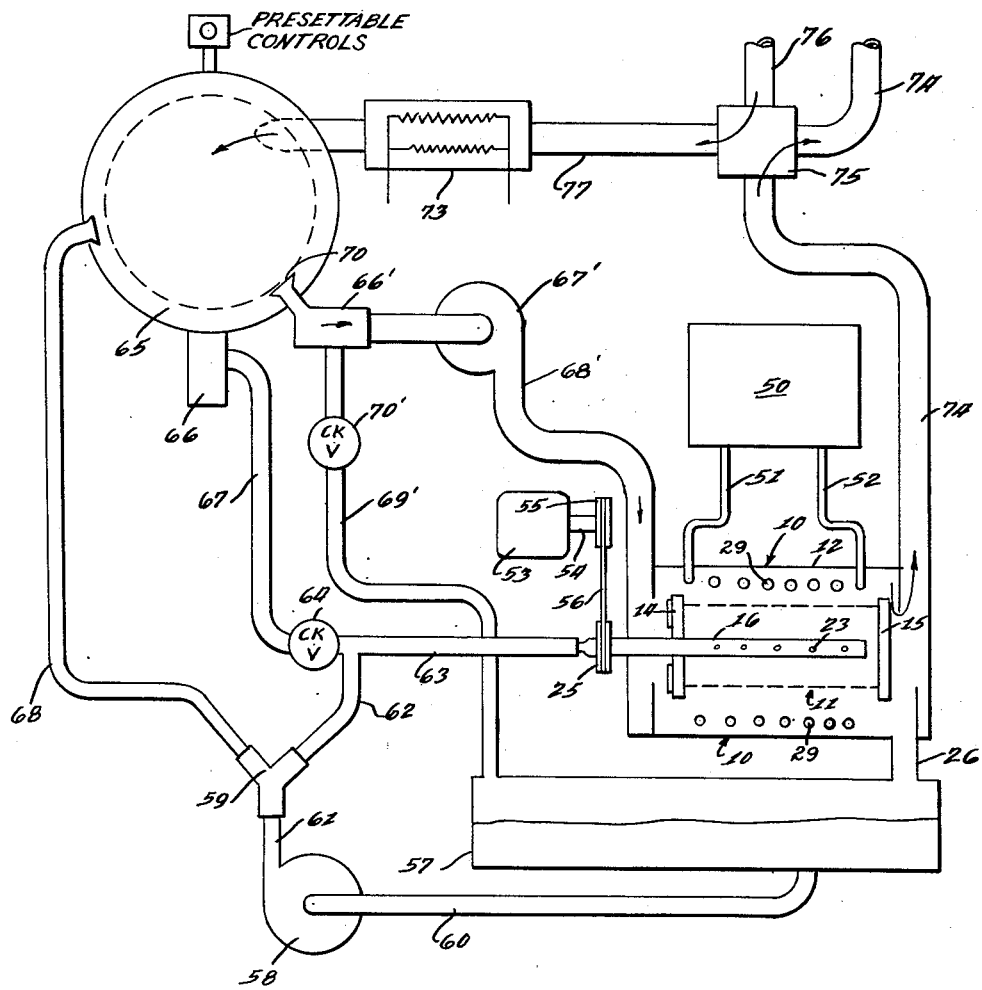

United States Patent Office 3,163,028
Patented Dec. 29, 1964

3,163,028
AUTOMATIC DRY CLEANING MACHINE AND COMBINED FLUID FILTER AND VAPOR CONDENSER
Laddie A. De Pas, Sodus, Raymond W. Spiegel, Stevensville, and Gordon J. Krolzick, St. Joseph, Mich., assignors to Whirlpool Corporation, St. Joseph, Mich., a corporation of Delaware
Filed Jan. 26, 1962, Ser. No. 169,059
16 Claims. (Cl. 68—12)

This invention relates to a combination filter and condenser, and more particularly to a compact filter and condenser adapted for use in dry cleaning operations. Heretofore, filters and condensers have constituted separate and comparatively bulky components of dry cleaner units.

In accordance with the invention, a foraminous drum is journalled in a housing containing condenser coils in its wall. The drum may have a filter additive against its foraminous wall, and carries external blades for moving air past the condenser coil. The journalling shaft for the drum is a hollow conduit receiving solvent to be filtered from a pump or the like, and rotated by a pulley or the like. Solvent to be filtered passes from the conduit in the shaft and through shaft openings within the drum. Thus the solvent is filtered by centrifugal force as it passes through the drum, and is returned to a reservoir therefor. Likewise, vapor-laden and solvent-carrying air enters the portion of the housing between the drum and the condenser coil wall and is moved by the fan blades on the rotating drum past the said coil so that the solvent is condensed to similarly be returned to the reservoir. However, the dried air is returned to the dry cleaner, or otherwise dispersed.

Accordingly, it is an object of the present invention to provide an unusually compact and efficient filter and condenser unit.

Another object of the invention is to provide a unit as described wherein the turbulence provided by fan blades on the filter drum during rotation of the filter drum passes air in circulation past condenser coils to remove solvent therefrom.

Another object of the invention is to provide a device as described which, during the dry cycle, not only circulates the solvent-laden air to the condenser coils but in addition extracts all the solvent from the filter media.

Another object of the invention is to provide a device as described wherein the compact unit is prepared for the next cycle as the result of this drying of the filter media.

Another object is to provide a unit as described wherein the filter media can be removed with media dried, and with a minimum time expenditure, and a minimum of mess.

Another object of the invention is to provide a unit and procedure as described, which eliminates the need for cooking out the solvent from the filter media. Thus, in present commercial filters, the fuzz must be cooked in a muck cooker to remove the costly solvent. In the instant invention, the solvent is removed as a result of the spinning of the filter during the said dry cycle, so that when a service man removes the filter bag with the filter media therein, no cooking is necessary.

Other objects and advantages of the invention will become apparent as the description proceeds in accordance with the drawings in which:

FIGURE 3 is a schematic view of a dry cleaner unit embodying the filter-condenser unit of the present invention.

Figure 1:
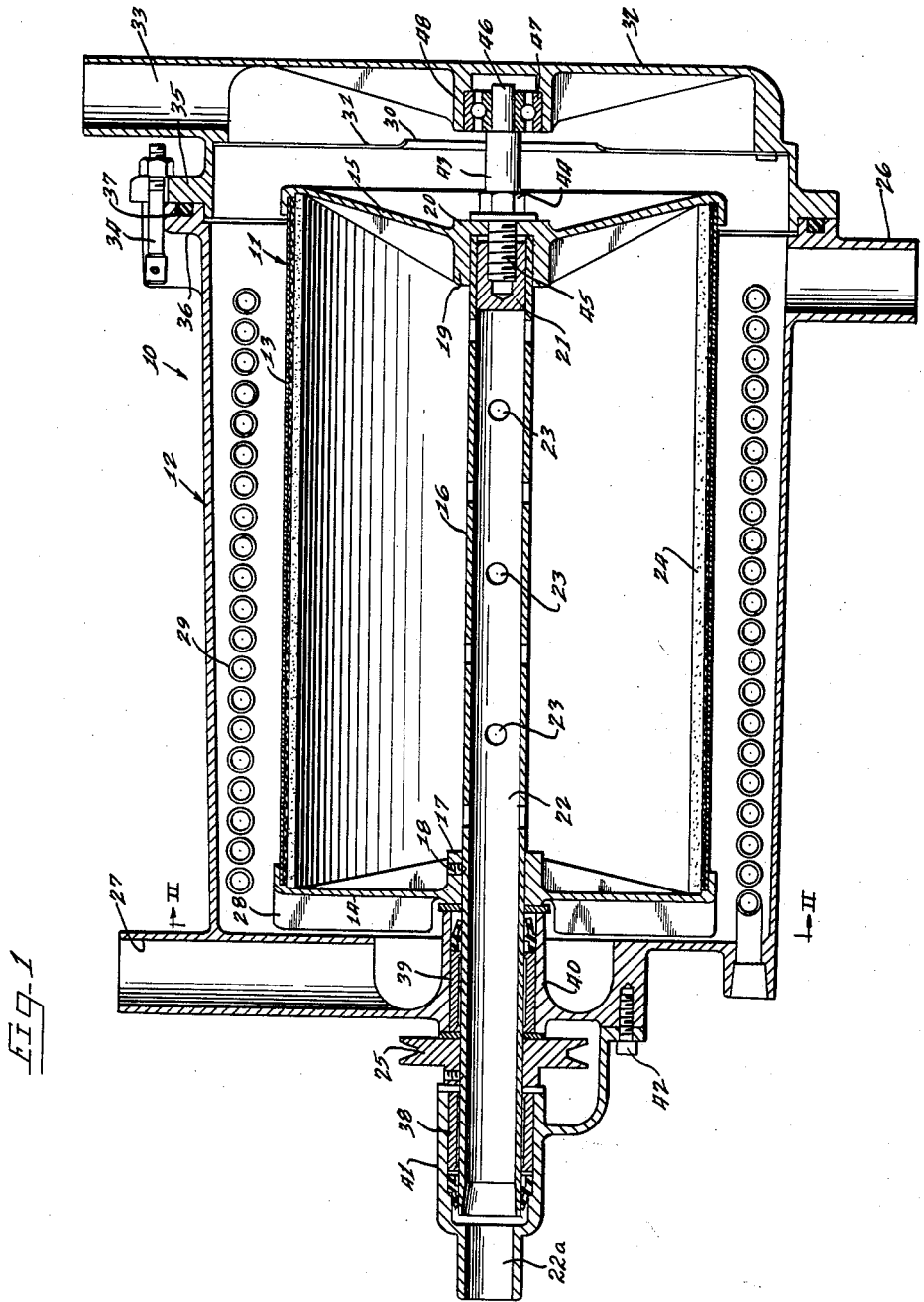
FIGURE 1 is a vertical sectional view of a filter-condenser unit according to the present invention.
Figure 2:
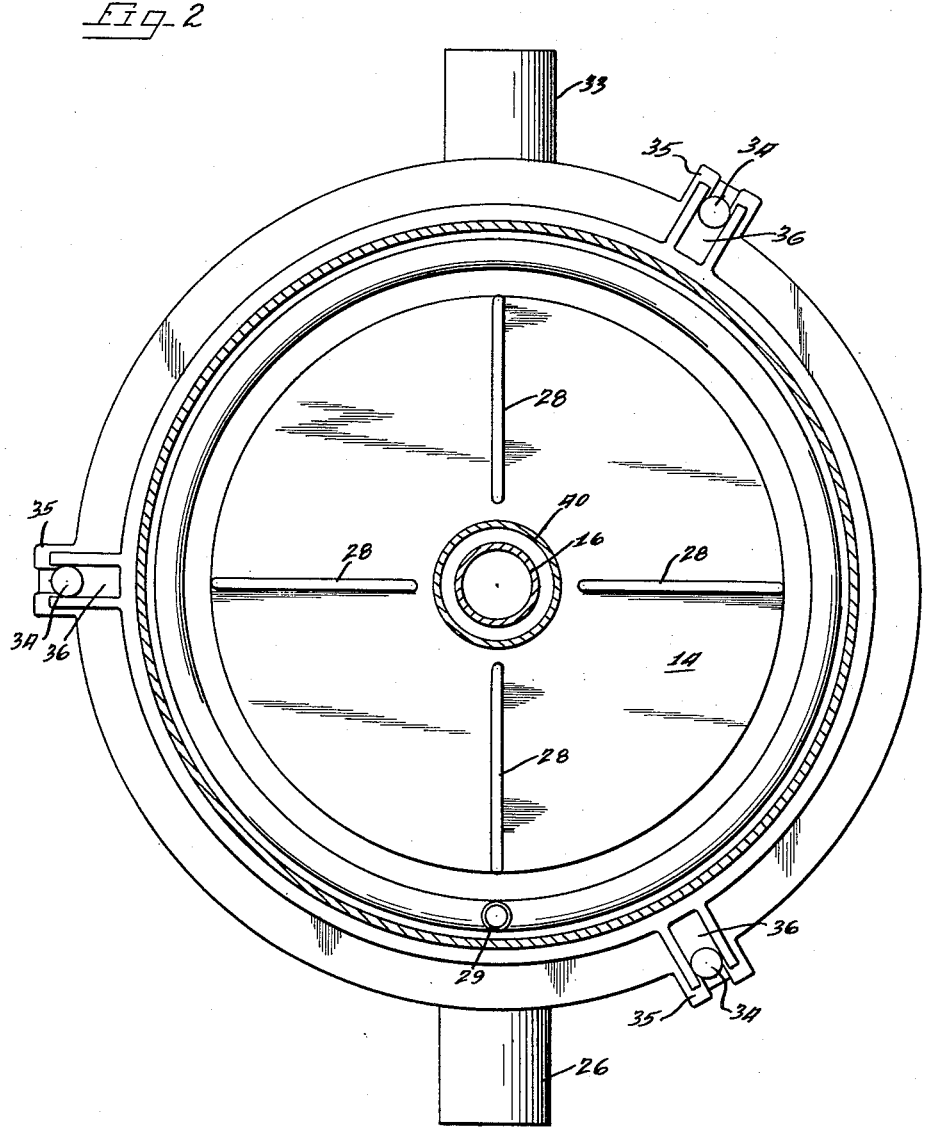
FIGURE 2 is a vertical sectional view taken along the lines II—II of FIGURE 1.

Referring now to the drawings, and to FIGURES 1 and 2 in particular, a novel filter-condenser unit 10 is shown according to the present invention which combines a drum 11, for the purpose of containing a filter material in a condenser 12. The drum or carrier 11 includes a cylindrical, foraminous wall 13 having drum ends 14 and 15 fixedly secured thereto. A shaft or hollow center post 16 has the drum ends 14 and 15 rigidly secured thereto as by a sleeve 17 and stud 18 threaded therein for the end 14; and a sleeve 19 having an end 20 and fitted on a block 21 in the shaft 16, as hereinafter described. The shaft 16 being hollow forms a conduit at 22 for receiving solvents, and also defines a plurality of openings 23 leading into the interior of the drum. In order to provide an effective filtering action, a layer of suitable filtering media such as diatomaceous earth is deposited on the inside of the drum wall 13 to form a filter bed 24.

In order to drive the shaft 16 and hence to drive the drum 11, a pulley 25 is rigidly connected to the shaft to cause the shaft to rotate during the filtering operation, as driven by suitable belt and drive means as hereinafter described. As solvent introduced through the inlet to the conduit 22 is passed through the openings 23 to build up on the filter bed 24, the centrifugal force of rotation of the drum forces this solvent through the filter media and out through the perforations in the drum wall 13. The purified solvent then passes through a conduit 26 in the housing 12 to be returned to a reservoir, as hereinafter set forth.

It will be appreciated by those skilled in the art that the solvent is passed into the drum to be filtered during the wash cycle of a dry cleaning machine or the like. Thus, the solvent filtered through the drum is a liquid solvent.

However, during the dry cycle of such a machine, solvent and air vapors must be treated. These solvent and air vapors from the vacuum nozzle 70 pass through a conduit 27 and across fan blades 28 which are preferably integrally formed on the wall 14 of the drum although they may be formed axially along the drum or otherwise. Since the filter rotates continuously, the fan blades assist in circulating the solvent and air vapors across refrigerant coils 29 according to the invention, which are mounted between the housing wall 12 and the foraminous wall 13 of the drum 11. It should be understood that other coolants may be used in coils 29 such as water and perchloroethylene. Thereby, the solvent is condensed out from the air and passed through the said conduit 26 to the reservoir of the dry cleaning machine, as hereinafter noted. It should be appreciated that the solvent vapor may be introduced to the condenser by conventional blower systems as well as the vacuum extraction method.

The system described meets the necessary conditions for effective condensation as follows: (1) the liquid vapor should be in intimate contact with the heat exchange surface; (2) the "contact time" should be as long as possible; and (3) there should be turbulence at the surface to remove the liquid as rapidly as its condenses. In a system according to the invention, the "perc" solvent vapor (perchloroethylene) is 5.7 times heavier than air and is thus effectively "held against" the cold surface by centrifugal force. Rotating blades on the drum create the turbulence and may also afford the centrifugal force.

The dry and treated air then is enabled to pass through an axial opening 30 in a baffle 31 which is positioned in an end cap 32 for the machine. The air desirably passes from the opening 30 through a conduit 33 and into the heater box as hereinafter shown, to re-enter the dry cleaning machine.

The end cap 32 is held to the housing 12 by a plurality of bolt means 34 engaging respective flanges 35 and 36 on the end cap and housing. An O-ring 37 desirably is set in the flanges 36 in sealing relation with the flange 35 to prevent leakage of solvent from the end cap in the main body.

In order to support the drum 11 for spinning and filtration as described, the shaft 16 is supported at one end by bearings 38 and 39 which may be set in a suitable extension 40 of the housing 12 and in a cap and tube structure 41 secured thereto by bolts 42. The other end of the shaft 16 receives a shaft structure 43 releasably and threadedly secured in the block 21 which is welded in the shaft 16. Thus, the shaft 43 has a nut 44 which may be used to secure the extension 45 thereof threadedly in the block 21. However, the shaft 43 also has a reduced end 46 which is journalled in a bearing 47 mounted in a hub portion 48 of the end cap 32.

When it is desired to service the filter, the end cap 32 is removed by releasing the bolt means 34 as described, and the nut 44 which is welded to the shaft 43, or otherwise secured thereto, may be used to remove the threaded portion 45 of the shaft from the block 21. Thereby, the end wall 15 of the drum may be completely removed from the shaft 16. Thus, the filter media bag for the media 24 may be removed and a new one inserted.

In a typical embodiment, the filter bed 24 is 8 inches in diameter and 12 inches long, so that the resultant 301 sq. inch filter area can afford a 53 p.s.i. pressure on the inside surface of the filter bed, when spun at 2000 r.p.m.

In this connection, it may be noted that the capacity "throughput" of a given filter is a function of the filter area, filter porosity (degree of filtration required), and the pressure drop across the filter bed. When particles of one micron or less must be removed from a liquid, the filter area or the pressure must be increased to maintain a high throughput. Thus in a system as described, a seven inch inner diameter filter drum filled with perchloroethylene and rotating at 300 r.p.m. will have a 90 p.s.i. pressure acting against the filter surface; and this can be accomplished with a low power input in an otherwise low pressure system.

It is an advantage of this spinning during the dry cycle that the filter media is dried out so that no mess is encountered when the filter media bag is removed, and no cooking is required. Further, all the solvent is saved without any such cooking procedure.

Referring now to FIGURE 3, it will be seen that the condenser coil 29 receives refrigerant from a compressor unit or refrigerator structure 50 provided with conduits 51 and 52 for circulating the refrigerant through the coil.

The structure of FIGURE 3 represents a typical dry cleaning system in which the condenser-filter unit 10 may be used. In this embodiment, the motor for driving the pulley 25 is indicated by reference numeral 53, and is disclosed as driving a shaft 54 with a pulley 55 entraining a belt for the said pulley 25. Thus the shaft 16 may be driven at a rate controlled by the speed of the said motor in a presettable sequential cycle corresponding to the wet wash and dry cycle.

In the first portion of the dry cleaning cycle, solvent is drawn from a reservoir 57 through a low pressure recirculating pump 58 and thence to the solvent filter 11, as controlled by two-way valve 59 affording a circuit through the conduit 60 leading from the reservoir, the pump 58, a conduit main branch 61 prior to the valve, a conduit branch 62 and a main branch 63 leading to the inlet 22a in the cap and tube structure 41. It is assumed that the check valve 64 leading from the cleaner 65 and foreign articles trap 66 with conduit 67, is closed at such time.

After the solvent is thus filtered, it is returned to the solvent reservoir 57 as hereinabove described.

During the wash portion of the dry cleaning cycle, solvent is drawn from the reservoir 57 through the two-way valve 59 and into the clothes cylinder 65 of the dry cleaning machine by the conduit 68. After the solvent has passed through the clothes and has picked up the dirt and other material therefrom, it is passed through the trap 66 through the check valve 64, and then through the solvent filter and back to the reservoir 57.

During extraction and drying, solvent and solvent vapors are pulled from the clothes in the drum by a vacuum nozzle 70 controlled by a vacuum blower or the like 67'. The vacuum extraction method is explained in our copending Lachat et al. application Serial No. 59,237, filed September 29, 1960. The solvent and solvent vapors are pulled through a liquid separator and lint filter 66' where the liquid solvent and lint is removed from the air stream. The solvent and air vapors then pass through vacuum blower 67' to the condenser by way of conduit 68'. When vacuum blower 67' terminates operation, check valve 70' opens, due to the lack of a vacuum condition to keep it closed, allowing the liquid solvent to pass from the liquid separator and lint filter 66' to reservoir 57 via conduit 69'.

Solvent and air vapors enter filter-condenser 10 from conduit 68' through conduit 27 and pass over fan blades 28. Fan blades 28 circulate these vapors across refrigerant coils 29 which condense the solvent vapors. The stripped air is then returned to heater box 73 by way of an outlet conduit 74 leading from the outlet 33, through valving means 75 and through conduit 77.

From the heater box, the air passes back into the clothes cylinder 65; and the condensed solvent returns to the reservoir 57 through the conduit 26 also as hereinbefore described.

During the deodorizing or air freshening portion of the dry cleaner cycle, fresh air from the atmosphere is brought into cylinder 65 via conduit 76, conduit 77, air heater box 73 (the heaters being de-energized during this portion of the cycle) and from the heater box 73 to the cylinder 65. The fresh air and any remaining solvent vapors are removed from cylinder 65 to filter-condenser 10 via nozzle 70, vacuum blower 67' and conduit 68'. The stripped air continues to valve means 75 by way of outlet 33 and conduit 74. The valve means 75 is positioned so as to allow the air to discharge to the atmosphere via conduit 72, as well as simultaneously allowing fresh air to enter through conduit 76.

There has thus been provided an unusually efficient and compact filter-condenser unit which may be used in a wide variety of situations in addition to those herein described.

It will be understood that we wish to embody within the scope of the patent warranted hereon all such modifications as reasonably and properly come within the scope of our contribution to the art.

We claim:

1. A combination fluid filter and vapor condenser comprising,
   a housing,
   rotatable drum means positioned in said housing and including peripheral filter wall means,
   means for introducing fluid to be filtered into said drum means interiorly of said peripheral filter wall means,
   means for rotating said drum means to effect the filtration of said fluid through said peripheral filter wall means by centrifugal force,
   means for introducing fluid vapors into said housing,
   and condenser means formed around said drum means within said housing and spaced from said drum means for condensing said fluid vapors.

2. A combination fluid filter and vapor condenser comprising,
   a housing,
   a rotatable drum having a foraminous peripheral wall positioned within said housing,
   filter means within said peripheral wall,
   means for introducing fluid to be filtered into said drum interiorly of said peripheral wall, means for rotating said drum to effect the filtration of said fluid through said peripheral wall by centrifugal force, means for introducing fluid vapors into said housing, and condenser means formed around said drum within said housing and spaced from said drum for condensing said fluid vapors.

3. A combination fluid filter and vapor condenser comprising, a housing, rotatable drum means positioned in said housing and including peripheral filter wall means, means for introducing fluid to be filtered into said drum means interiorly of said peripheral filter wall means, means for rotating said drum means to effect the filtration of said fluid through said peripheral filter wall means by centrifugal force, means for introducing fluid vapors into said housing, and condenser means formed around said drum means within said housing and spaced from said drum means for condensing said fluid vapors, the rotation of the drum aiding in the introduction of said fluid vapors.

4. A combination fluid filter and vapor condenser comprising, a housing, rotatable drum means positioned in said housing and including peripheral filter wall means, means for introducing fluid to be filtered into said drum means interiorly of said peripheral filter wall means, means for rotating said drum means to effect the filtration of said fluid through said peripheral filter wall means by centrifugal force, means for introducing fluid vapors into said housing, condenser means formed around said drum means within said housing and spaced from said drum means for condensing said fluid vapors, and blades formed on said drum externally thereof to assist in circulating the fluid vapor to be condensed with turbulence against said condenser means.

5. A combination fluid filter and vapor condenser, comprising, a housing, rotatable drum means positioned in said housing and including peripheral filter wall means, means for introducing fluid to be filtered into said drum means interiorly of said peripheral filter wall means, means for rotating said drum means to effect the filtration of said fluid through said peripheral filter wall means by centrifugal force, means for introducing air into said housing to effect the evaporation of residual solvent fluids from said peripheral filter wall means, and condenser means formed around said drum means within said housing and spaced from said drum means for condensing said fluid vapors.

6. A combination filter and condenser comprising, a drum having a filter extending around the inner diameter of said drum, means for introducing fluid to be filtered into said drum, a condenser means formed around said drum, means for introducing fluid vapors to be condensed between said drum and said condenser means, means for rotating said drum, the drum urging the fluid vapors to be condensed toward said condenser means by centrifugal force, and blades formed on said drum externally thereof to assist in driving the fluid vapors to be condensed with turbulence toward said condenser means.

7. A filter-condenser system comprising, a drum having a perforated cylindrical wall, a layer of filter media positioned within said drum against said wall, a hollow center post forming a conduit rigidly supporting said drum, said drum having end walls at least one of which engages said conduit, said conduit having openings formed inside of said drum to introduce filterable fluid from said conduit into said drum, means for rotating said center post to rotate said drum and effect the filtration of said fluid through said filter media, condenser means formed around said drum in radially spaced relation thereto to condense fluid vapor introduced between said drum and said condenser means, and means for introducing fluid vapor between said drum and said condenser means, said drum discharging fluid vapors centrifugally to be condensed against said condenser means.

8. A filter-condenser system comprising, a drum having a perforated cylindrical wall adapted to retain a layer of filter media against said wall, a hollow center post forming a conduit and rotatably supporting the drum, the drum having end walls at least one of which engages the conduit, the center post having openings formed within the drum to introduce filterable fluid from the conduit into the drum, means for rotating the conduit to rotate the drum, and condenser means radially outwardly of said drum to condense fluid vapor introduced between said drum and said condenser means, said drum having a plurality of blades externally thereof to drive the fluid vapor to be condensed against the condenser means under conditions of turbulence.

9. A filter-condenser system comprising, a drum having a perforated cylindrical wall, a filter in said drum lying against said wall, a hollow center post rotatably supporting the drum, the drum having end walls at least one of which engages the center post, said center post having openings formed therein inside of the drum to introduce filterable fluid into the drum, means for rotating the drum, and condenser means formed around the drum to condense fluid vapor introduced between said drum and said condenser means, said drum having a plurality of blades externally thereof to drive the fluid to be condensed against the condenser means, said condenser means including a condenser coil and refrigerant means therefor, said condenser coil encircling the drum and spaced radially outwardly thereof.

10. A filter-condenser system comprising, a drum having a perforated cylindrical wall, a filter in said drum lying against said wall, a center post rigidly supporting the drum, the drum having end walls at least one of which engages the center post, said center post forming a conduit having openings within the drum to introduce filterable fluid from the conduit into the drum, means for rotating the drum, and condenser means formed around the drum in radially spaced relation thereto to condense fluid introduced between the condenser means and the drum, said drum having a plurality of blades externally thereof to drive the fluid to be condensed against the condenser means, and an outlet for receiving the condensed fluid.

11. In a vacuum-extraction dry cleaner, vacuum means for leading off solvent and solvent vapors from clothes, a drum having an external foraminous wall and an internal filter thereagainst, means for rotating the drum, means for introducing liquid to be filtered including solvent into the drum, condenser means around the drum in spaced relation thereto and including outlet means for condensed solvent, and a conduit communicating the vacuum means with the area between the drum and the condenser means whereby solvent may be condensed and released to said outlet.

12. In a vacuum-extraction dry cleaner,
vacuum means for leading off solvent and solvent vapors from clothes,
a drum having an external foraminous wall and an internal filter thereagainst,
means for rotating the drum,
means for introducing liquid to be filtered including solvent into the drum,
condenser means around the drum in spaced relation thereto and including outlet means for condensed solvent,
and a conduit communicating the vacuum means with the area between the drum and the condenser means whereby solvent vapor may be condensed and released to said outlet, said drum having blades formed therearound to create turbulence in the area between the drum and the condenser means and to urge the solvent materials from the vacuum means and conduit against the condenser means.

13. In a vacuum-extraction dry cleaner,
vacuum means for leading off solvent and solvent vapors from clothes,
a drum having an external foraminous wall and an internal filter thereagainst,
means for rotating the drum,
means for introducing liquid to be filtered including solvent into the drum,
condenser means around the drum in spaced relation thereto and including outlet means for condensed solvent, and a conduit communicating the vacuum means with the area between the drum and the condenser means whereby solvent may be condensed and released to said outlet, said drum having blades formed therearound to create turbulence in the area between the drum and the condenser means and to urge the solvent materials from the vacuum means and conduit against the condenser means,
and conduit means for leading air free from solvent back to the dry cleaner.

14. In a dry cleaning machine with presettable controls for operating the machine through a program of washing, extracting and drying periods,
vacuum means for drawing solvent and solvent vapors from clothes during an extraction and drying period,
a rotatable drum having a filter therein,
condenser means around the drum,
means for introducing solvent containing fluid into the drum,
means for introducing solvent and solvent vapors from the vacuum means into the area between the drum and the condenser means,
a reservoir communicating with the condenser means to receive solvent condensed thereby and released from the drum,
and means for returning solvent to the dry cleaning machine from the reservoir.

15. In a dry cleaner having presettable controls for operating the machine through a program of washing, extracting and drying periods,
vacuum means for drawing solvent and solvent vapors from clothes during an extraction and drying period,
a rotatable drum having a filter therein, condenser means around the drum,
means for introducing solvent containing fluid into the drum,
means for introducing solvent and solvent vapors from the vacuum means into the area between the drum and the condenser means,
a reservoir communicating with the condenser means to receive solvent condensed thereby and released from the drum,
means for returning solvent to the dry cleaning machine from the reservoir,
and conduit means for returning treated, solvent-free air to the dry cleaner.

16. In a dry cleaner having presettable controls for operating the machine through a program of washing, extracting and drying periods,
vacuum means for drawing solvent and solvent vapors from clothes during an extraction and drying period,
a rotatable drum having a filter therein, condenser means around the drum,
means for introducing solvent containing fluid into the drum,
means for introducing solvent and solvent vapors from the vacuum means into the area between the drum and the condenser means,
a reservoir communicating with the condenser means to receive solvent condensed thereby and released from the drum,
means for returning solvent to the dry cleaning machine from the reservoir,
heater means,
and conduit means for returning treated, solvent-free air to the dry cleaner and for moving the air through the heater means to be initially heated.

References Cited in the file of this patent
UNITED STATES PATENTS

| 1,234,498 | Seymour | July 24, 1917 |
| 1,385,724 | Smith et al. | July 26, 1921 |
| 1,669,235 | Fenton | May 8, 1928 |
| 1,993,407 | Hetzer | Mar. 5, 1935 |
| 2,044,185 | Pugh | June 16, 1936 |
| 2,223,663 | Roberts | Dec. 3, 1940 |
| 2,301,803 | Davis | Nov. 10, 1942 |
| 2,555,866 | Weaver et al. | June 5, 1951 |
| 3,066,519 | Boswinkle | Dec. 4, 1962 |
| 3,110,170 | Long | Nov. 12, 1963 |